United States Patent [19]

Dell et al.

[11] Patent Number: 5,623,506
[45] Date of Patent: Apr. 22, 1997

[54] METHOD AND STRUCTURE FOR PROVIDING ERROR CORRECTION CODE WITHIN A SYSTEM HAVING SIMMS

[75] Inventors: Timothy J. Dell, Colchester, Vt.; Jimmy G. Foster, Raleigh, N.C.

[73] Assignee: International Business Machines Corporation, Armonk, N.Y.

[21] Appl. No.: 356,098

[22] Filed: Dec. 15, 1994

Related U.S. Application Data

[63] Continuation-in-part of Ser. No. 188,245, Jan. 28, 1994, Ser. No. 187,859, Jan. 28, 1994, Pat. No. 5,379,307, and Ser. No. 227,444, Apr. 14, 1994, which is a continuation-in-part of Ser. No. 188,245, and Ser. No. 187,859.

[51] Int. Cl.⁶ .................................................. G06F 11/10
[52] U.S. Cl. .......................................... 371/40.1; 371/49.3
[58] Field of Search ................... 371/37.3, 37.7, 371/40.1, 40.4, 49.3, 49.1, 51.1; 395/425, 550

[56] References Cited

U.S. PATENT DOCUMENTS

| | | | |
|---|---|---|---|
| 4,850,892 | 7/1989 | Clayton et al. | |
| 4,955,024 | 9/1990 | Pfeiffer et al. | 371/40.1 |
| 5,014,273 | 5/1991 | Gagliardo et al. | 371/40.1 |
| 5,052,001 | 9/1991 | Jeppesen, III et al. | 371/51.1 |
| 5,058,115 | 10/1991 | Blake et al. | 371/40.1 |
| 5,070,450 | 12/1991 | Holman, Jr. et al. | |
| 5,127,014 | 6/1992 | Raynham | 371/37.3 |
| 5,235,602 | 8/1993 | Klim | 371/49.3 |
| 5,241,643 | 8/1993 | Durkin et al. | |
| 5,265,218 | 11/1993 | Testa et al. | 395/425 |
| 5,287,364 | 2/1994 | Kimura | 371/40.4 |
| 5,347,559 | 9/1994 | Hawkins et al. | 395/550 |
| 5,394,541 | 2/1995 | Chesley et al. | 395/550 |

FOREIGN PATENT DOCUMENTS 1-208799  8/1989  Japan .................................. 371/40.4

OTHER PUBLICATIONS

"Error Detection and Correction Unit" (Sep. 1987), Chapter of Intel® technical reference manual, 1990, pp. 2–17, 2–20, 2–21.

*Primary Examiner*—Roy N. Envall, Jr.
*Assistant Examiner*—Steven R. Garland
*Attorney, Agent, or Firm*—R. S. Babayi; Calfee, Halter & Griswold

[57] ABSTRACT

A computer system is provided which has ECC, and which system has a first group of SIMMs having DRAMs thereon for storing data bits and a second group of SIMMs having DRAMs thereon for the storage of check bits. The system also has a memory controller which is programmed to operate at least about 10 nanoseconds slower than the DRAMs. During the write cycle, check bits are generated for and specific to each data byte, with the bits of the data byte being stored in the first group of SIMMs and the check bits stored in the second group of SIMMs. During the read cycle, new check bits are generated and compared with the stored check bits. Each single bit error is corrected and certain multiple bit errors are detected.

19 Claims, 4 Drawing Sheets

METHOD AND STRUCTURE FOR PROVIDING ERROR CORRECTION CODE WITHIN A SYSTEM HAVING SIMMS

RELATED APPLICATION

This is a continuation-in-part of application Ser. No. 08/188,245, filed Jan. 28, 1994, entitled "Method and Structure for Providing Error Correction Code for Each Byte on SIMMs, and a continuation-in-part of application Ser. No. 08/187,859, now U.S. Pat. No. 5,379,304 filed Jan. 28, 1994, entitled "Method and Structure for Providing Error Correction Code and Parity for Each Byte on SIMMs, and a continuation-in-part application Ser. No. 08/227,444, filed Apr. 14, 1994, which in turn is a continuation-in-part of application Ser. No. 08/188,245 and application Ser. No. 08/187,859, now U.S. Pat. No. 5,379,304.

FIELD OF THE INVENTION

This invention relates generally to computer systems which generate Error Correction Code (ECC) bits for storage on single inline memory modules (SIMMs). In certain embodiments, this invention relates to providing error correction code on each byte of a data word written to and from a computer system to SIMMs as a part of a multiple byte data word or as a single-byte data word and which SIMMs can be used on computer systems which do not have or cannot change dynamically their wait states.

BACKGROUND OF THE INVENTION

The integrity requirements for personal computer systems have grown rapidly in the past few years. At the present time, newer operating systems and applications require a great deal of memory, and the amount of memory which can be accommodated in personal computer systems continues to increase rapidly. Such personal computer systems have in the past typically been provided only with the capability of writing and checking parity—if even that. Moreover, some computer systems generate "odd" parity and some generate "even" parity. In such a case of parity, if an odd number of bits of memory is corrupted, the bad parity condition will be flagged, and generally the system will halt when the error is detected. This poses a significant problem since users can ill afford to have periodic system crashes and/or loss of data; and, as the amount of memory increases, the possibility of such data corruption increases significantly. In the case of systems which do not write and check parity, corrupted data can cause malfunction of the system. Moreover, with the advent of large applications which normally require large amounts of memory, these are the most exposed to such a crash and data corruption.

As indicated above, until very recently most conventional current low end personal computer systems contained at best only parity SIMMs which can detect an odd number of bit errors, but cannot correct such errors. Moreover, a parity function cannot detect double or other even number bit errors.

One solution which has been proposed to eliminate system crash or corruption of data due to single-bit errors is to provide error correction code for use in computer systems. Typically, this error correction code allows for the detection of most double-bit errors and the correction of all single-bit errors. These schemes are a significant improvement over purely parity SIMMs. One technique for utilizing ECC is the so-called 32/7-bit ECC algorithm. This ECC algorithm requires 7 check bits for each double word (i.e., 4 bytes or 32 bits, thus the designation 32/7). This results in a 39-bit wide memory SIMM required for each double word and associated 7-check bits (32 data bits+7 check bits). Thus, the widely-used 36-bit wide memory SIMM is not available to be used, although this is a conventional and popular size SIMM and is used with double words containing only parity bits which requires only 36 bits (32 data bits plus 4 parity bits). More importantly, many systems do not have wait states that are dynamically programmable either in the system or in the bus interface circuit or memory controller, and thus read-modify-write (RMW) operations cannot be performed because of the additional time required for RMW. Moreover, many controllers do not have the capability of performing the read-modify portion of a RMW cycle. RMW is required when less than all of the bytes of a multiple data byte word are being written. For example, if only one byte of a four-byte data word is being rewritten, a RMW cycle must be performed to recalculate and generate new check bits or the check bits associated with the entire 32 bits of data will be in error.

Thus, in the case of systems configured to write less than all the bytes of a multiple byte data word (which is typical) and where ECC has been attempted, the systems or at least the interface circuit has to be modified to provide for the necessary delays and capability to perform a RMW cycle when the ECC algorithm uses all of the data bits and generate check bits such as in the 32/7 bit ECC algorithm. Most memory controllers can, however, add a slight delay to their DRAM control timings during power-on, which is a static change (i.e., not a dynamic change) and does not change after power-on. This is required, for example, to support either 70 ns DRAMs or 80 ns DRAMs, both of which are presently in very common use in the industry.

In the application Ser. No. 08/187,859, filed Jan. 28, 1994, an improved ECC on SIMM is disclosed which allows writing of single byte words and which SIMMs are compatible with systems which do not have wait states nor the read modify capability necessary for RMW cycles and wherein parity of the written data is checked. If bad parity is detected such bad parity is flagged on the read cycle. However, in this disclosed system, the SIMM must "know" whether the system is configured to check either "odd" parity or "even" parity. Thus, a given SIMM is useful only in one or the other type of parity systems. This requires not only two different types of SIMMs, but knowledge on the part of the SIMM user or installer which parity is being generated by the system on which it is to be installed.

In application Ser. No. 08/227,444, Error Correction Code capabilities are disclosed which reside on individual SIMM used in a computer system which has only parity generating capabilities. This is a big advantage over previous systems. However, this requires that a user discard all previous SIMMs and replace them with the SIMMs having ECC on board to achieve ECC on that SIMM. This is expensive. Moreover, the ECC is only operable on the SIMM or SIMMs which have been replaced, and thus is not systemwide. At the system design level, a system designer could design a new system that uses converted SIMMs—but typical ECC requires RMW cycles which necessitate a system redesign with attendant added costs and speed penalties (up to 30%) for use of ECC with RMW cycles.

SUMMARY OF THE INVENTION

According to the present invention, a computer system and method of operating the computer system are provided wherein the computer system has error correction code internally (i.e., separate from the SIMMs) and is compatible with computer systems not having error correction code and which computer systems need not dynamically change their wait states nor support read-modify cycles. The computer system has logic circuitry which determines whether the system is an "odd" parity or "even" parity, or no parity system. For systems that use parity, parity of the written data is checked. If bad parity is detected, the generated check bits are manipulated to show such bad parity on the read cycle. Also, parity is generated when the stored data is read and delivered to the computer system where it can be checked. The preferred computer system employs conventional SIMMs for storage of data, and additional SIMMs for storage of check bits from the ECC. The additional SIMMs are of a conventional design, but modified to include a column address strobe (CAS) line for each check bit field, which in this case is 4 or more bits. Alternatively, various combinations of x32, x36, x39, x40, x48 . . . SIMMs could be used in various configurations to achieve this end. Thus, systemwide ECC is provided using combined SIMMs without the need of a dynamic change in wait states or support of read-modify cycles, both necessary for RMW cycles. It may be necessary to change the memory controller programmable timings upon power-on to accommodate the additional 10 ns delay of the ECC logic depending upon the timing of the DRAMs.

DESCRIPTION OF THE PREFERRED EMBODIMENT

Figure 2:
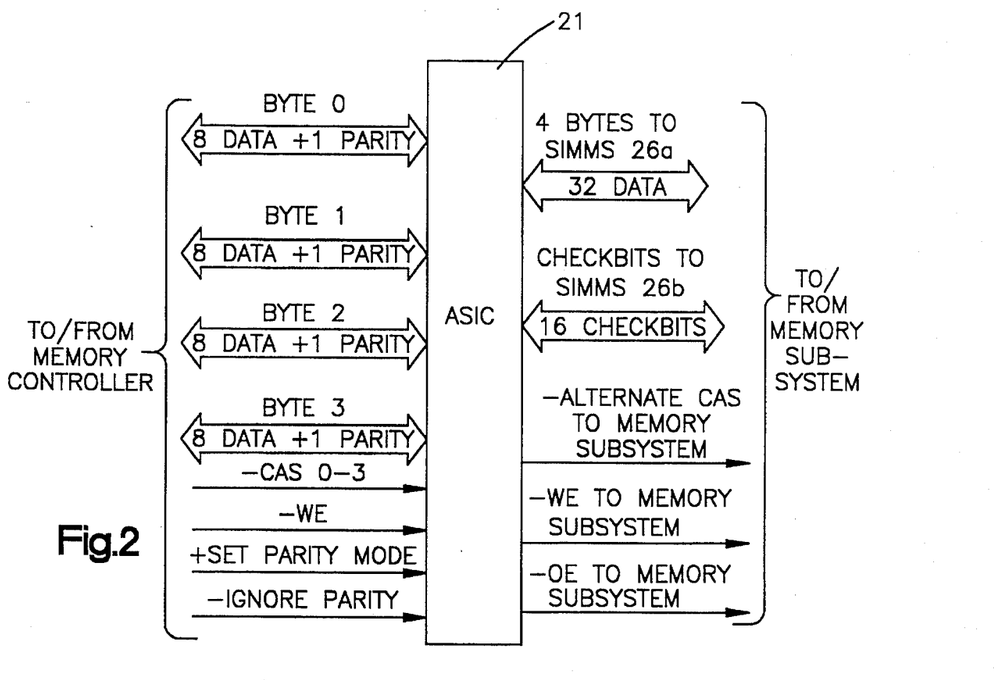
FIG. 2 is a high-level schematic representation of an ASIC chip with ECC capabilities according to this invention.

The preferred embodiment will be described in the environment of an IBM Personal Computer using an Intel 80386 or 80486 microprocessor and with single in-line memory (SIMMs) having dynamic random access memory (DRAM) chips to provide and control the memory function. (A SIMM is sometimes referred to as a DRAM card which means the DRAM and all chips and circuits on the SIMM.) For the purpose of this description, the system will be described as it is used with a CPU capable of generating parity bits for the data bytes that it writes and also reading and comparing parity information read from storage. Moreover, the CPU and associated system generates parity bits, and it does not matter whether the system generates "odd" parity or "even" parity; i.e., the invention can be used with either type of system by using the set parity mode line (FIG. 2).

Figure 1:
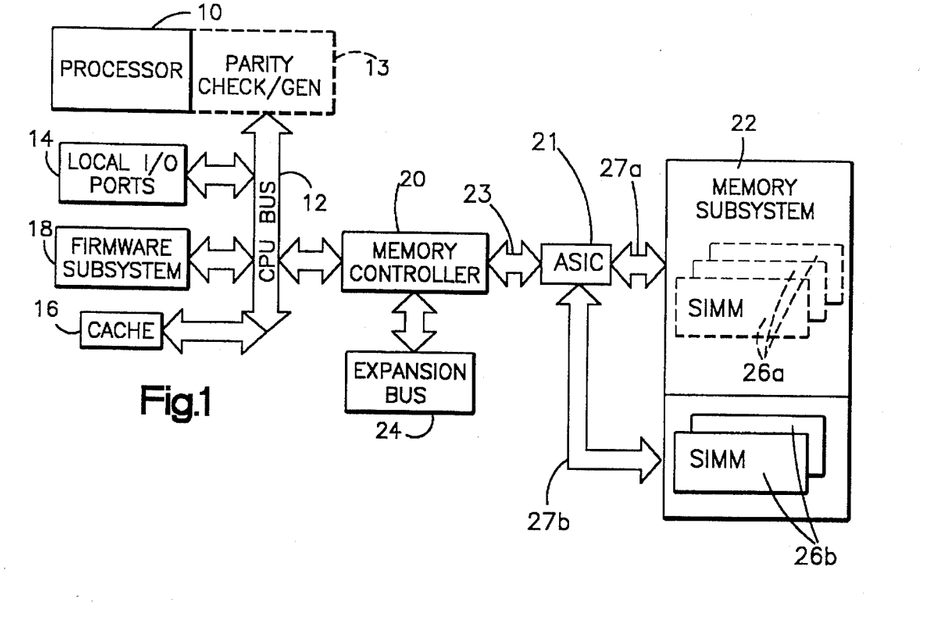
FIG. 1 is a high-level diagram showing the interconnects of a personal computer with a bus and add-on memory cards (SIMMs) according to this invention.
Figures 2A, 2B:
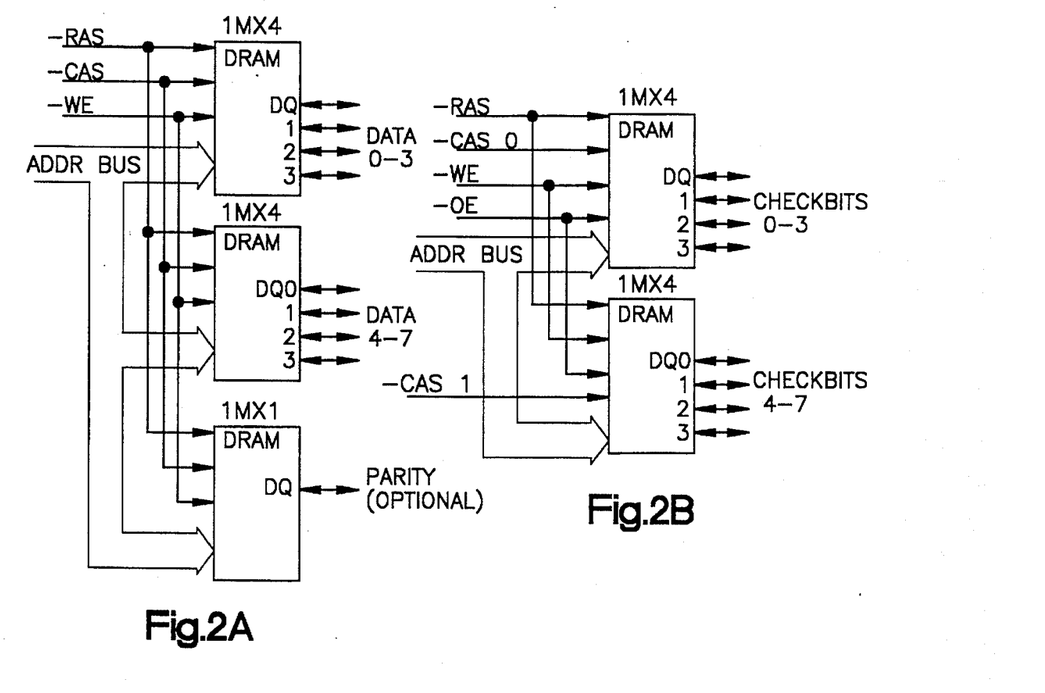
FIG. 2A is a diagram of certain bus and signal line configurations for a conventional SIMM.
FIG. 2B is a diagram of the modifications of the signal configurations for an add-on SIMM for use in storing check bits according to this invention.

As can be seen in FIG. 1, there is provided a CPU 10 which is connected to a CPU or system bus 12. A parity generation and check unit 13 preferably is provided which also generates or checks parity of data being either written by or read by the CPU 10 to or from the bus 12. This can be either "odd" or "even" parity. The CPU bus 12 may also have local I/O ports 14, CACHE memory 16, and firmware subsystems 18 associated therewith. A memory controller 20 is also connected to the system bus 12, and coupled to an ASIC (application specific integrated circuit) chip 21 by bus 23 for performing the error correction function of this invention. The ASIC chip 21 is connected to a memory subsystem 22. Certain of the bus and signal line interconnections between the ASIC 21 and the memory controller 20 and memory subsystem 22 are shown in FIG. 2. The memory controller 20 is normally connected to an expansion bus 24 if one is present. The memory subsystem 22 is typically comprised of one or more SIMMs 26a. These SIMMs 26a are used to store data in a conventional manner. Certain of the bus and signal line interconnections with the ASIC chip 21 are shown in FIG. 2A for the storage of one byte of data together with one parity bit. This arrangement is typically two 1M'4 DRAMs for storing data and one 1M×1 DRAM for storing parity. A preferred SIMM is the well known 72-pin SIMM. The subsystem 22 is also provided with one or more SIMMs 26b. The SIMMs 26b are used to store check bits generated by the ASIC chip 21 in a manner which will be described. Certain of the bus and signal line interconnections with the ASIC chip 21 are shown in FIG. 2B. SIMMs 26b are typical 72 pin SIMMs slightly modified as shown in FIG. 2B. In this configuration, only two 1M×4 DRAMs are needed without the need of the 1M×1 since no parity will be stored. Moreover, as will become apparent, each DRAM on SIMM 26b handles the check bits relating to two DRAMs on SIMMs 26a. Also, conventional SIMMs 26a are modified by adding a CAS line for each byte set of check bits. The SIMMs 26b are inserted in additional SIMM slots (not shown) provided for this purpose. The ASIC chip 21 is connected to the SIMMs 26a through data bus 27a and to SIMMs 26b through a check bit bus 27b. It is to be understood that the system just described is illustrative of systems on which the present invention can be used since one feature or aspect of the present invention is the provision of an added ECC capability which can be utilized on virtually any CPU system having the capability of receiving non-ECC SIMMs as add-on memory with only minor modification of the planar and no impact on the other components in the system. If the SIMMs 26a have x36 DRAMs, which are often used to store data and parity bits, 4 extra bits of storage are available, one for each data word since parity bits are not stored. This extra storage can be used to store one of the check bits. Indeed, this would be an ideal configuration for a 5 bit ECC which could detect and correct many more errors. Moreover, SRAMs instead of DRAMs could be used, and either of these types of RAM could be maintained on the planar board. Thus, either the SIMMs or RAMs mounted on the board or other storage RAM configuration constitute a memory module. In addition, this invention can be used with other than 8 bit bytes, e.g., "bytes" of 20 bits, or some other multiple number of bits, although such "bytes" of other than 8 bits are very uncommon.

As indicated above, the CPU 10 is capable of writing data onto the bus 12 which in turn will be conveyed to the correct memory address in subsystem 22 by the memory controller 20 through ASIC chip 21 which also writes ECC check bits to memory. Upon writing data by the CPU 10, parity bits are generated for each byte of information written to memory by the parity generating and checking device 13 which also checks parity on information read from the memory subsystem 22 during a read cycle to determine parity error as will be described presently. The memory controller also provides the necessary signals, such as Row Address Strobe (RAS), Column Address Strobe (CAS), Write Enable (WE), and on some systems Output Enable (OE), and Byte Select (BS), etc., to the memory subsystem 22. The memory controller 20 will read and write data and parity bits to ASIC chip 21, and ASIC chip 21 will read and write data, and check bits to each of the appropriate SIMMs 26a and 26b, also as shown in FIG. 2. It should be understood that this invention is applicable to a wide variety of SIMMs having many different form factors. For example, it can be used in conjunction with the following SIMM forms: 72 pin×32; 72 pin×36; 168 pin×64; 168 pin×72; 88 pin DRAM card; 68 pin DRAM card; 68 pin PCMCIA card, and 72 pin small outline DRAM card.

The error correction code logic includes logic contained on ASIC chip 21 which will check the parity bits written by the CPU on a "write" cycle and manipulate the check bits if bad parity is detected to show bad parity when read. The logic will also regenerate parity bits for each byte fetched on a read cycle.

As indicated above, the SIMMs 26a and 26b each have a plurality of DRAMs which typically are conventional 1M×4 DRAM chips which are commercially available. The SIMMs 26a typically will also contain a 1M×1 DRAM for storing parity bits. The type of DRAMs used on SIMMs are conventional for add-on memory modules and need not be described further. Other DRAMs such as 256K×4; 4M×4; 16M×4, etc., can also be used. If desired, the DRAMs can be formed in a stacked configuration.

As can be seen in FIG. 2, ASIC chip 21 includes various lines coming from the memory controller 20 to bring the various signals such as RAS, CAS and WE. Also, bus 23 is provided between the ASIC chip 21 and the memory controller 20 which provides for interchange of data between the ASIC 21 and memory controller 20. In this preferred embodiment, a 36-bit wide bus is used which delivers 8 data bits and 1 parity bit per byte to the ASIC chip 21 from the memory controller 20. The ASIC chip 21 provides, among other things, the logic needed to perform the read and write functions of the data to the SIMMs 26a, and in so doing generate check bits, the check bits being generated such that there are 4 check bits associated with each byte of data. It should be understood that 5 or more check bits could also be generated. With 4 check bits, all single bit error can be identified and corrected and some multiple bit errors detected, but not corrected. With 5 check bits, all single and double bit errors can be identified and single bit errors corrected. The invention will be described using 4 check bits, but the function is the same using 5 or more check bits. The more check bits that are provided, the more robust the error correction can be.

Each data byte (8 bits) from the ASIC chip 21 is stored in one of the SIMMs 26a in a conventional manner. Certain of the configurations of certain of the signal lines and address bus are shown in FIG. 2A for a conventional SIMM 26a. The generated 4 check bits from the ASIC chip 21 are stored in one of the SIMMs 26b. Conventional SIMMs are modified slightly to include a CAS line for each data byte's check bits as shown in FIG. 2B. It will be appreciated that the arrangement and configuration of the ASIC chip 21 and SIMMs 26a and 26b as shown allows a 4-byte data word to be written and the ECC check bits generated individually for each byte and each byte and its associated check bits stored individually. Therefore, if during any write cycle less than the entire four byte data word is being written or rewritten, this can be done without doing a read-modify-write cycle which would be required if all of the data bytes participated in writing all of the check bits such as is common in the 32/7 algorithm. Hence, neither a wait state nor read modify write cycle need be programmed into the computer system with its inherent loss of performance, including the processor or memory controller, but rather during each write operation check bits are generated, and during each read operation check bits are regenerated as syndrome bits and error correction made on each byte individually on each read operation.

The logic and generation of the check bits by the ASIC chip 21 is as follows: ASIC chip 21 receives 4 bytes (32 bits) of data plus 4 parity bits (one for each byte of data) on the 36-bit bus 23. The logic of ASIC chip 21 includes circuitry that generates 4 check bits from the 8 data bits of each byte supplied thereto. Thus 4 check bits are being generated specifically using the data bits of each 1 byte of data. Thus ASIC chip 21 generates 16 check bits, 4 for each byte. The data bits, i.e., the 4 bytes (32 bits) of data, are supplied on bus 27a to SIMMs 26a and the 16 check bits are supplied to SIMMs 26b on bus 27b. Four check bits are associated with each byte of data.

Figure 3A:
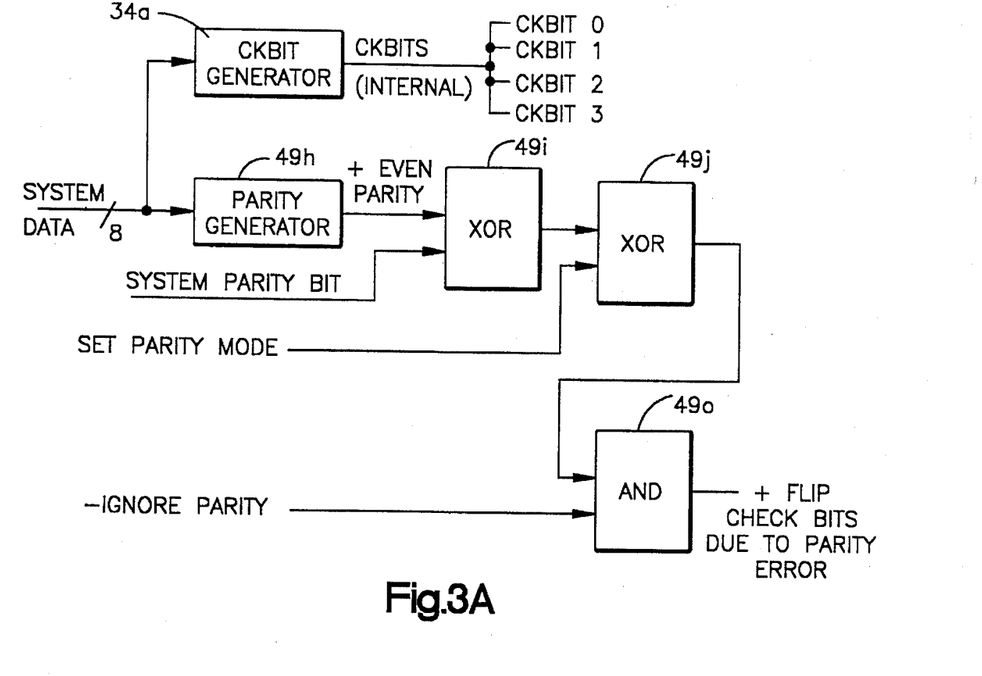
FIG. 3A is a circuit diagram showing the logic for checking parity on a write cycle.
Figure 3B:
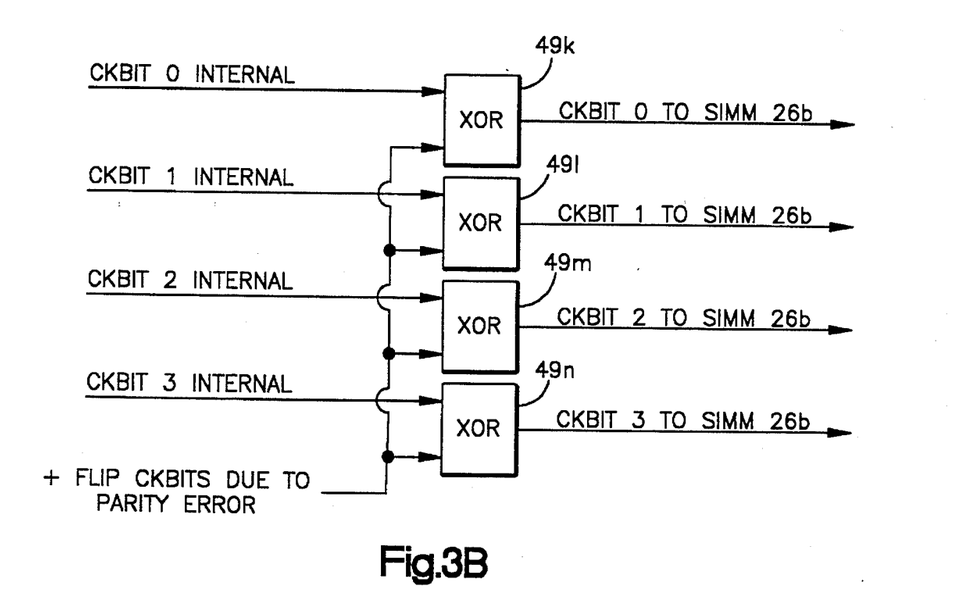
FIG. 3B is a circuit diagram showing the logic for "flipping" the check bits if bad parity is detected.

The circuitry for generating check bits and also for sensing the parity type of the system parity generation and checking the parity of the data is shown in FIGS. 3A–3B. The description will be for handling 1 byte (8 bits) of data, it being understood that the other 3 bytes (24 bits) are handled in the same fashion. The data bits DQ0 through DQ7 and parity bit PQ8 are received by ASIC chip 21. The ASIC chip 21 senses and checks parity as will be described presently, and the data bits DQ0–DQ7 are supplied to a check bit generator 34b (FIG. 3B) which generates 4 check bits. The 8 data bits are supplied to and stored in a DRAM on bus 27a and the 4 check bits are supplied to and stored on a DRAM in one of the SIMMs 26b on bus 27b. The same process occurs in the ASIC for the other 3 data bytes received on bus 23. The error correction algorithm is shown in Table I below. In this table, the data bits which participate in generating each check bit are shown and marked with an "X".

TABLE I

| Data Bit | 7 | 6 | 5 | 4 | 3 | 2 | 1 | 0 |
|---|---|---|---|---|---|---|---|---|
| Check Bit 0 |   | X |   | X | X |   | X | X |
| Check Bit 1 |   | X | X |   | X | X |   | X |
| Check Bit 2 | X |   |   |   | X | X | X |   |
| Check Bit 3 | X | X | X | X |   |   |   |   |

Of course, a different algorithm would be used if 5 or more check bits were used.

The handling of the parity is as follows: since the ECC does not store a parity bit per se, each access must handle parity bit generation on the fly. For read operations, the parity bit is generated from the 8 data bits and is not affected by the check bits unless an uncorrectable error occurs in which case bad parity is flagged to the CPU. On a write operation, parity is checked on each byte, every single write cycle. The reason for this can be understood by comparing the ECC parity bit handling according to this invention with a typical x36 SIMM's parity handling. In a typical x36 SIMM, the parity bit is just another "data" bit and, if bad parity is sent on a store operation, it will remain in memory as bad parity. On any subsequent read of that data, bad parity will be presented to the system and recognized. In the ECC, the parity bit is not used at all to generate the check bits and is not stored. Therefore, if parity were not distinctly checked and accounted for, a write with bad parity would be stored in memory with correctly generated check bits for the incorrect data pattern. Then, the subsequent access of that data would see a new parity bit generated and the data would be sent back to the system with correct parity on incorrect data. The effect is to change a detectable error into an undetectable one. Since this is clearly not a desirable effect, the parity is checked on every write and if an error is detected, the check bits are manipulated such that on the subsequent read of that data, an uncorrectable error syndrome is generated and bad parity is guaranteed to be sent back to the system, regaining the data integrity that is required. The manipulation of the check bits in the preferred embodiment is to "flip" each check bit to its inverted logic state. As will be seen presently, this will have the effect of causing the subsequently generated syndrome bits to show an uncorrectable error.

The set parity mode line of the ASIC is hard wired to either "even" or "odd" parity based on whether the memory controller is generating/detecting even or odd parity.

This invention can be used in systems that do not utilize parity by tying the ignore parity signal of FIGS. 2 and 3A to ground, thus inhibiting the flip check bit function on write cycles. For read cycles, the generated parity bit is simply ignored by the system.

In FIG. 3A showing the data write logic, each data eight-bit word is supplied to the check bit generator 34a and also to a parity generator 49h which generates even parity which is supplied to XOR gate 49i. The parity bit ("0" or "1") supplied by the system is also supplied to XOR gate 49i. The output of XOR gate 49i is supplied to XOR gate 49j. If the system parity is even and correct, the output of XOR gate 49i is a logic "0", and if the system parity is odd and correct, the output of XOR gate 49i is a logic "1". XOR gate 49j XOR's the output from XOR gate 49i with the set parity mode signal. If the system parity is set to even parity and the correct parity is sensed by the XOR gate 49i, then the logic "0" is output from XOR gate 49j since logic "0's" are received from both the set parity mode signal and XOR gate 49i. Similarly, if the system parity is odd and the output of XOR gate is good, parity is detected as a logic "1" and the input from parity generator 49h to XOR gate 49j is also a logic "1".

Thus, in either case, whether the system/memory controller 20 is generating "odd" parity or "even" parity, the output from XOR gate 49j is a logic "0" indicating good parity. Conversely, assuming that this received system parity is bad parity, then if the system is generating even parity it will be received as odd parity, which will be different from the even parity which is generated from the byte by parity generator 49h. These will then be outputted from XOR gate 49i and inputted to XOR gate 49j as a logic "1". XOR gate 49j is receiving even parity from the set parity mode signal as a logic "0" which causes the XOR gate to output a logic "1" indicating bad parity, which will invert or "flip" the check bits as previously described. Similarly, if the system is generating "even" parity, the logic of the XOR gates 49i and 49j will generate a logic "1" or bad parity if bad parity is received from the system.

The circuit for inverting or flipping the check bits is shown in FIG. 3B. As shown herein, each of the check bits 0–3 from the check bit generator 34a is inputted to one of XOR gates 49k, 49l, 49m, 49n, respectively. Also, the output from XOR gate 49j is ANDed by AND gate 49o with ignore parity signal. The output of AND gate 49o is inputted to each XOR gate 49k, 49l, 49m, 49n (FIG. 3B). If the output is bad parity, it will flip each of the check bits from either a "0" to "1" or a "1" to a "0". "Flipped" check bits indicate bad parity. Hence both manipulated check bits and data bits are stored in DRAM memory, with one type of manipulated check bits indicating bad parity. If parity is to be ignored, the ignore parity line into AND gate 49o is held low and will prevent the+flip check bits due to parity even signal out of AND gate 49o from ever activating.

The set parity mode signal is also used in the generation of parity on the read cycle as will be described presently.

Figure 4:
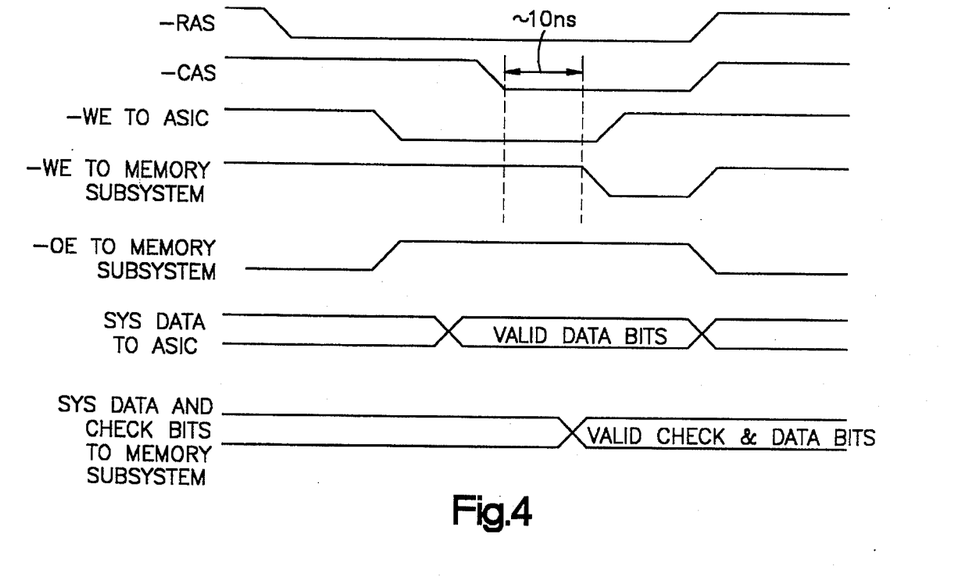
FIG. 4 is a timing diagram of certain signals used on the write cycle.

The timing for generating and storing the check bits together with the data bits is crucial and can best be understood by reference to the timing diagram shown in FIG. 4. In FIG. 4, the timing diagram shows the RAS, CAS, WE to ASIC 21 WE to memory subsystem 22, OE, the system data to ASIC 21 and system data and check bits to the DRAMs on SIMMs 26a and 26b. WE to ASIC 21 is the signal from the memory controller 20 to the ASIC 21 and the WE to memory subsystem 22 is the "late" write enable signal to the memory subsystem 22. In order for the error correction code to operate within a single write operation cycle of the SIMM without requiring wait states or read modify operations and to be able to read the check bits, generate syndrome bits and correct data, it is necessary that the DRAMs operate at a faster speed than the operating speed of the SIMM itself. This allows slower SIMMs to be used. SIMM architecture standards are, in general, governed by JEDEC (Joint Electronic Device Engineering Council) standards. Industry standards for timing are based on the JEDEC architecture standards. According to one conventional industry standard, either a read operation or a write operation based on the timing of the signals must be completed within 70 nanoseconds. However, the JEDEC industry standards do not presuppose error correction taking place, and thus in order to stay within this parameter, it is necessary to perform the error correction function within the time limit normally allocated to merely read and write and perhaps check parity. To accomplish this, DRAM chips are selected which have a faster operating speed than the speed of the SIMM by at least about 10 nanoseconds. Thus, for a SIMM which has an operating time or parameter of 70 nanoseconds for a read operation or write operation, the DRAM must operate at about 60 nanoseconds or faster. Alternatively, a single delay cycle can be statically programmed into the memory controller by the BIOS (basic input/output system) or start-up code of the processor during power-up if necessary. However, this slight delay (≈10 ns) may not require an additional wait state, depending on system timings. This will allow the system to be used with slower DRAMs on SIMMs Referring now to FIG. 4, after RAS goes low followed by the WE to ASIC 21 going low when CAS goes low valid data will appear on the bus from the memory controller 20 to ASIC 21. Because the delayed WE to memory subsystem 22 signal causes the write cycle to appear to be a read cycle at the beginning, the OE signal from ASIC chip 21 is used to tristate the DRAM I/O's before the WE to memory subsystem 22 goes low. However, this data cannot be latched into memory until the check bits are generated, which requires a certain finite amount of time. Thus, to this end, as indicated above, the late write cycle on the DRAM is used. This is done by maintaining the WE to memory subsystem 22 line high for about 10 nanoseconds after CAS has gone low. During this 10 nanoseconds, check bits are being written. At the end of these 10 nanoseconds when the WE to memory subsystem 22 goes low, both the data bits and the check bits are latched into DRAMs on SIMMs 26a and 26b as indicated before. This is shown in the system data to ASIC 21 and system data and check bits to memory subsystem 22 signal wherein it is shown that valid data write takes place when the CAS goes low, but the valid data and check bits do not appear until the WE to memory subsystem 22 signal has gone low. These data bits and check bits are latched in DRAMs of SIMMs 26a and 26b.

Figure 5:
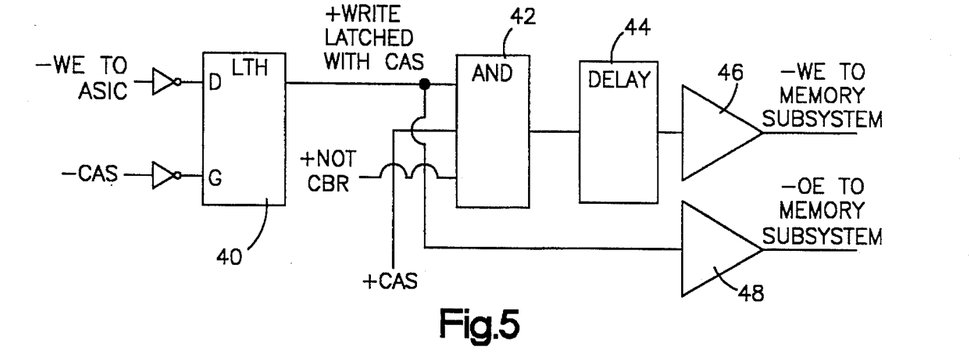
FIG. 5 is a block diagram of the components to do a late write function.

The logic to perform this and to manipulate the check bits for bad parity is shown in FIG. 5, wherein the WE to ASIC 21 signal and the CAS signal are shown going to a latch 40. The output from the latch 40 is supplied as a +write latched together with CAS to an AND gate 42, the output of which is supplied to a delay block 44 and thence to a driver 46 the output of which is the delayed write to SIMMs. Also, inputs to the AND gate are a +not CBR (CAS before RAS) and also a +CAS input. The +write latched with CAS is also supplied to a second driver 48 so as to provide an OE signal to the SIMMs.

The reason for and functioning of this circuit are as follows. Typically, the WE to memory subsystem 22 must be valid and often only is valid before CAS falls and then held for about a maximum of 15 ns after CAS falls. A straight delay on WE to memory subsystem 22 would not be wide enough to write data. Hence, this is written to the latch 40, and when CAS falls, the latch samples the signal on WE to memory subsystem 22 signal. The latch 40 maintains the data valid as long as CAS stays low.

The latch 40 is transparent, so what is impressed on the input of the latch 40 appears at the output which is a write enable as CAS goes low, and will stay as an output as long as CAS is low. In this state, the data flows through the latch 40 and thus the need for the delay. The AND gate 42 operates to block signals before CAS becomes active. The delay block 44 provides the necessary time to generate the check bits before the data is latched into memory. The time of delay is typically 3–9 ns. The +CAS and not CBR (CAS before RAS) signals are impressed on the input of the AND gate 42 so that data will not be written on a refresh cycle if CAS is low during a refresh mode done as CBR. Thus, by utilizing the late write function of the DRAMs together with a DRAM that is faster than the speed that the memory controller expects the SIMM to be, an 8-bit data byte can be written and check bits generated in the normal write operation of the SIMM.

Alternatively, if slower SIMMs are used, the ASIC will provide an "Alternate CAS" signal which is delayed the same amount as the check bit generation logic delays the data bits. This allows the slower SIMMs to not have an OE signal provided, which is typical of many SIMMs today.

Figure 7:
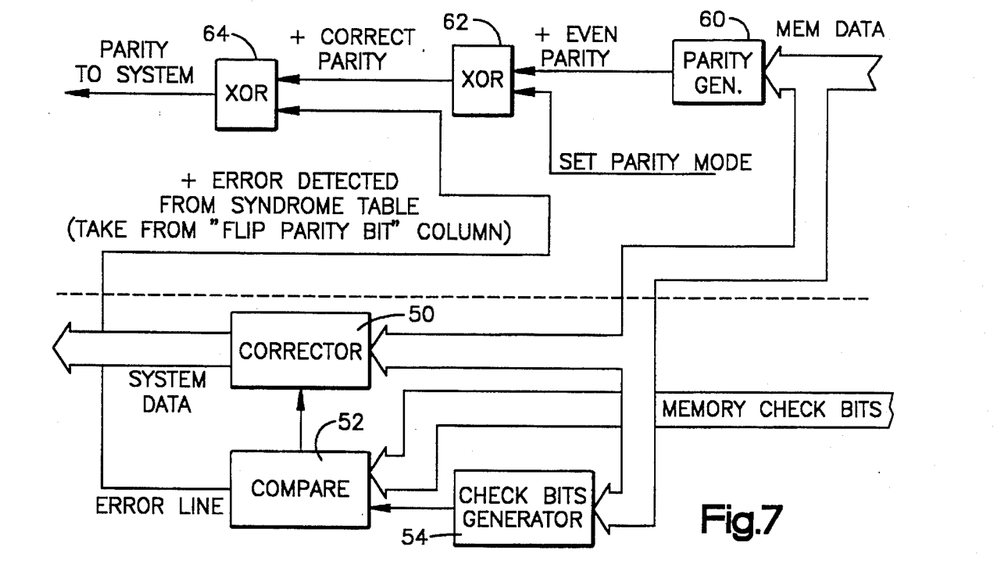
FIG. 7 is a circuit diagram showing the logic for regeneration of check bits, generation of syndrome bits, and correcting single-bit errors and detect some multi-bit errors and generating parity from the stored data.

The data when read on a read operation goes through logic which generates new check bits, compares the newly-generated check bits with the stored check bits and then writes a syndrome table which is the well-known manner of error correction of single-bit errors and detection of some multi-bit errors. This also has to be done within the time standard set for the SIMM card. Once again, there is a need for the fast DRAM, the DRAM being at least about 10 nanoseconds faster than the memory controller expects the SIMM to be. The circuitry for the error correction code is shown in FIG. 7 wherein the 8 bits of memory data constituting a data byte are read from memory SIMM 26a to a corrector 50. At the same time, the 4 associated check bits stored in a SIMM 26b are also read and impressed on a comparator 52. The 8 memory data bits are also impressed on a check bit generator 54 which regenerates the check bits based on the stored 8 bits of data. These regenerated check bits are also supplied to the comparator 52 where the originally-generated and stored check bits are compared with the newly-generated check bits to generate syndrome bits. The syndrome bit table and the errors which they indicate are shown in Table II below.

TABLE II

| Syndrome 3210 | Bit in Error | Action | | |
|---|---|---|---|---|
| | | Toggle Data | Toggle Parity | Error Output |
| 0000 | None | N | N | N |
| 0001 | Check Bit 0 | N | N | Y |
| 0010 | Check Bit 1 | N | N | Y |
| 0011 | Data Bit 0 | Y | Y | Y |
| 0100 | Check Bit 2 | N | N | Y |
| 0101 | Data Bit 1 | Y | Y | Y |
| 0110 | Data Bit 2 | Y | Y | Y |
| 0111 | Data Bit 3 | Y | Y | Y |
| 1000 | Check Bit 3 | N | N | Y |
| 1001 | Data Bit 4 | Y | Y | Y |
| 1010 | Data Bit 5 | Y | Y | Y |
| 1011 | Data Bit 6 | Y | Y | Y |
| 1100 | Data Bit 7 | Y | Y | Y |
| 1101 | Multi Bit Error | N | Y | Y |
| 1110 | Multi Bit Error | N | Y | Y |
| 1111 | Multi Bit Error | N | Y | Y |

The syndrome bits are generated by XORing each newly-generated check bit with the comparable stored check bit. If they are all "0"s, the syndrome bits as shown in the table will be 0000, which will indicate that there is no error. Single bit errors will show up as various syndrome bit patterns. It will be noted that all single-bit errors can be detected and hence corrected. Certain multi-bit errors can be detected which are shown in the syndrome table as syndrome 1101, 1110 and 1111. These all indicate multi-bit, and hence uncorrectable, errors. (It should be noted that if desired a 4-bit ECC code for a single byte can be used to detect all two bit errors but not correct them—but it cannot both correct all single bit errors and detect all two bit errors.) With respect to the parity handling, if a parity error on the write cycle was detected, then the check bits generated were all "flipped." Hence, in this case, when the check bits are regenerated, and not "flipped" during a read cycle the XORing will cause a syndrome bit pattern of "1111" indicating an uncorrectable error. The syndrome bits are impressed on the corrector 50 and if any bit needs to be corrected because of a single-bit error, that particular bit is "flipped". The corrected data is delivered out as system data in 8 bits out to the system bus.

Of course, a different syndrome table would be used for 5 or more check bits.

During the read cycle parity is also generated so that any error involving an odd number of bits occurring in the transmission of the data bytes to the system can be detected by the system as parity error. Again, it does not matter whether the system is an "even" parity or "odd" parity system. The logic for this is shown in FIG. 7, and includes a parity generator 60 which receives each eight-bit data word as it is received from memory and generates even parity, which is inputted to XOR gate 62. The set parity mode signal is also impressed on XOR gate 62. If the set parity mode signal indicates a logic "0" the output of XOR gate 62 will be logic "0". If the set parity mode signal indicates a logic "1", then XOR gate 62 will generate a logic "1" which indicates odd parity. In either case, the parity output from XOR gate 62 is the proper parity for the system as determined by the set parity mode signal. The output of XOR gate 62 is inputted to XOR gate 64 along with the output of comparator 52. Block 60 generates (arbitrarily) "even" parity for the memory read data. XOR gate 62 adjusts the parity if the ASIC 21 has the set parity mode set for an "odd" parity system. XOR gate 64 inverts the correct parity coming out of XOR gate 62 according to the "Toggle Parity" column of Table II. Comparator 52 provides the logic to do the "Toggle Parity" column. The toggle logic performs in the following manner. If the corrector 50 corrects a single bit error in a data byte by flipping that bit, the generated parity bit, which was generated using the uncorrected data, must also be "flipped" by output to XOR gate from the comparator 52. However if an error is detected in a check bit according to the syndrome table, this will not affect the parity since generating parity does not involve check bits. The final correct parity (good or bad) is delivered to the memory controller 20 from XOR gate 64. If a single bit or other odd number of bits error occurs in transferring the data from the ASIC 21 to the memory controller 20 and hence to the system, or if an uncorrectable error of read data is detected, the system parity generation/check 13 will detect such an error in a conventional manner.

Figure 6:
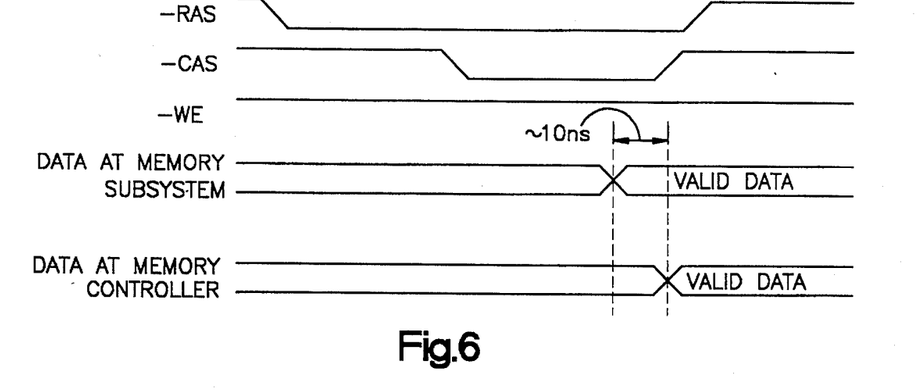
FIG. 6 is a timing diagram of the read cycle.

The signal diagram for this is shown in FIG. 6. When the RAS goes low followed by CAS going low and the WE to memory subsystem 22 being high, data is read from the SIMMs 26a and 26b through ASIC chip 21 and because it can be read in 60 nanoseconds as shown on the RAS line, there is an additional 10 nanoseconds available for the generation of the additional check bits, the generation of the syndrome bits and error correction which is shown as the 10 nanosecond delay. After the specified CAS access time (TCAC), the data from the SIMM can be latched as corrected data and impressed on the bus 23 to the memory controller 20. If the alternative method of using slower SIMMs, i.e., 70 ns, is employed, the memory controller must be set up to latch the data at a slightly slower time, for example 80 ns.

Thus it can be seen that by providing DRAMs which can operate faster than the operation cycle time of the SIMM according the JEDEC or whatever other standard to which it has been manufactured, or by statically programming a delay when using slower DRAMs if necessary, error correction can be performed on each byte of data independently.

The error correction function thus can be afforded to any system which writes one or more data bytes irrespective of the width or number of bytes in a data word. Of course, there is some penalty for utilizing 4 bits or 5 or more bits of error correction for each 8 bits of a data word; i.e., there is a somewhat increased amount of storage space necessary as opposed to utilizing a 32/7 or 64/8 algorithm of generating check bits. However, the advantage is that conventional SIMMs can be used in many systems, including those which do not have or require the necessary wait states or support the read modify portion of a read-modify-write cycle and is applicable as an easily made design modification to computer systems which do not have the required circuitry and logic for RMW operation. Thus, this invention has wide applicability in modifying systems which do not have conventional error correction code requiring RMW cycles, and can be used with standard SIMMs.

Accordingly, the preferred embodiment of the present invention has been described. With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

What is claimed is:

1. A computer system, which system generates multi-bit bytes of data and multi-byte data words, said system comprising:

a memory controller programmed to operate at a given speed;

logic to generate check bits from and specific to each data byte written;

a memory module having RAMs to store generated data bits and generated check bits;

logic to read said data bytes and associated check bits from the memory module and generate new check bits and compare the newly-generated check bits with the stored check bits to correct and output all single-bit errors;

said system being configured to allow said RAMs to operate at least about 10 nanoseconds faster than the speed at which the memory controller is programmed to operate.

2. The system as defined in claim 1 wherein said memory module includes at least one group of at least one SIMM.

3. The system as defined in claim 2 wherein said memory module includes a first group of at least one SIMM to store said generated data bits and a second group of at least one SIMM to store at least some of said generated check bits.

4. The invention as defined in claim 3 wherein said memory controller is programmable statically to have an operating time at least about 10 nanoseconds slower than said RAMs.

5. The invention as defined in claim 2 wherein said memory controller is programmable statically to have an operating time at least about 10 nanoseconds slower than said RAMs.

6. The system as defined in claim 1 wherein said system includes first logic circuits to write and read parity bits.

7. The system as defined in claim 6 further including logic circuits to manipulate said check bits by manipulating a plurality of check bits responsive to bad parity.

8. The invention as defined in claim 7 wherein said logic circuits to manipulate said check bits manipulates said check bits by inverting all check bits responsive to bad parity.

9. The invention as defined in claim 6 wherein said memory controller is programmable statically to have an operating time at least about 10 nanoseconds slower than said DRAMs.

10. The invention as defined in claim 1 wherein said memory controller is programmable statically to have an operating time at least about 10 nanoseconds slower than said RAMs.

11. The invention as defined in claim 10 wherein said system includes a logic to set the operating time of said memory controller upon power-up.

12. A method of providing error correction in a computer system which has a memory module having RAMs to store generated data bits and generate check bits, and which system writes multi-bit bytes of data, and a memory controller comprising the steps of:

configuring said memory controller to operate at least about 10 nanoseconds slower than the RAMs, generating check bits from and specific to each of the data bytes written; storing said data bits and said check bits in said memory module;

reading said data bytes and associated check bits from the memory module and generating new check bits and comparing the newly-generated check bits with the stored check bits and correcting any single-bit error and detect certain multi-bit errors.

13. The method of claim 12 wherein said memory module includes at least one SIMM, each having a RAM, and storing said data bits and said check bits in said RAMs.

14. The method of claim 13 wherein said memory module includes a first group of at least one SIMM and a second group of at least one SIMM, storing said data bits on said first group, and storing at least some of said check bits on said second group.

15. The method as defined in claim 12 further characterized by statically programming said memory controller to be at least 10 nanoseconds slower than the RAMs.

16. The method as defined in claim 15 further characterized by statically programming said controller upon power-up.

17. The method as defined in claim 12 wherein said system generates parity bits, stores said parity bits, regenerates parity bits from data bits read from the RAMs, and compares the stored parity bits and regenerated parity bits to determine good parity or bad parity.

18. An application specific chip for use in a computer system, which computer system generates multi-bit bytes of data and multi-byte data words, and which system includes a memory controller programmed to operate at a given speed, and which system includes at least one memory module having RAMs to store generated data bits and check bits, and wherein said system is configured to allow said RAMs to operate at least 10 nanoseconds faster than the speed of which the memory controller is programmed to operate, said application specific chip comprising, logic to receive multiple-byte data words and generate check bits from and specific to each data byte written, and write said generated check bits and said data bits to said memory module, logic to read said data bytes and associated check bits from the memory module and generate new check bits and compare the newly-generated check bits with the stored check bits to correct and output all single bit errors and output data bytes.

19. The chip as defined in claim 18 wherein said memory controller includes a late write function, and wherein said chip writes said check bits to storage utilizing said late write function.

* * * * *